(12) United States Patent
Zhang et al.

(10) Patent No.: US 10,128,756 B2
(45) Date of Patent: Nov. 13, 2018

(54) DC-DC CONVERTER WITH HIGH TRANSFORMER RATIO

(71) Applicant: SUNGROW POWER SUPPLY CO., LTD., Hefei, Anhui (CN)

(72) Inventors: Yanhu Zhang, Hefei (CN); Bing Hu, Hefei (CN); Ruilin Zhu, Hefei (CN); Liying Xue, Hefei (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 0 days.

(21) Appl. No.: 15/319,563

(22) PCT Filed: May 7, 2015

(86) PCT No.: PCT/CN2015/078441
§ 371 (c)(1),
(2) Date: Dec. 16, 2016

(87) PCT Pub. No.: WO2016/000489
PCT Pub. Date: Jan. 7, 2016

(65) Prior Publication Data
US 2017/0324329 A1   Nov. 9, 2017

(30) Foreign Application Priority Data

Jun. 30, 2014  (CN) .......................... 2014 1 0310090

(51) Int. Cl.
*H02M 3/158*   (2006.01)
*H02J 3/38*   (2006.01)
(Continued)

(52) U.S. Cl.
CPC ........... *H02M 3/1582* (2013.01); *H02J 3/383* (2013.01); *H02M 3/158* (2013.01);
(Continued)

(58) Field of Classification Search
CPC ..... H02M 3/1582; H02M 3/1584; G05F 1/24; G05F 1/40; G05F 1/44; G05F 1/56; G05F 1/59
(Continued)

(56) References Cited

U.S. PATENT DOCUMENTS

| | | | | |
|---|---|---|---|---|
| 6,084,790 A | * | 7/2000 | Wong .................. | H02M 3/1584 323/272 |
| 7,042,199 B1 | * | 5/2006 | Birchenough ...... | H02M 3/1582 323/271 |

(Continued)

FOREIGN PATENT DOCUMENTS

| | | |
|---|---|---|
| CN | 101702578 A | 5/2010 |
| CN | 101860245 A | 10/2010 |

(Continued)

OTHER PUBLICATIONS

International Search Report corresponding to Application No. PCT/CN2015/078441; dated Aug. 7, 2015.
(Continued)

*Primary Examiner* — Adolf Berhane
(74) *Attorney, Agent, or Firm* — Cantor Colburn LLP

(57) ABSTRACT

A DC-DC converter with a high transformer ratio includes two DC-DC converter bodies with inputs connected in parallel and outputs connected in series so as to ensure the high safe reliability and the high energy conversion efficiency of the DC-DC converter, while increase the boost ratio of the DC-DC converter.

6 Claims, 5 Drawing Sheets

(51) Int. Cl.
*H02M 3/335* (2006.01)
*H02M 3/155* (2006.01)
*H02M 1/00* (2006.01)

(52) U.S. Cl.
CPC .......... *H02M 3/33576* (2013.01); *H02M 2001/0077* (2013.01); *H02M 2003/1552* (2013.01)

(58) Field of Classification Search
USPC .............. 323/259, 265, 268, 271, 272
See application file for complete search history.

(56) References Cited

U.S. PATENT DOCUMENTS

| | | | | |
|---|---|---|---|---|
| 7,915,874 | B1* | 3/2011 | Cuk | H02M 3/158 323/224 |
| 8,975,881 | B2* | 3/2015 | Tsai | H02M 3/1584 323/272 |
| 9,190,899 | B2* | 11/2015 | Kumar | H02M 1/4225 |
| 2005/0024028 | A1* | 2/2005 | Ying | H02M 3/1584 323/272 |
| 2005/0270812 | A1 | 12/2005 | Vinciarelli | |
| 2010/0225286 | A1* | 9/2010 | Osaka | H02M 3/156 323/272 |
| 2010/0244789 | A1* | 9/2010 | Osaka | H02M 3/1584 323/271 |
| 2011/0221408 | A1* | 9/2011 | Martin | H02M 3/157 323/272 |
| 2012/0187929 | A1* | 7/2012 | Ohshita | H02M 3/1584 323/272 |
| 2012/0256561 | A1* | 10/2012 | Kwon | H05B 33/0827 315/307 |
| 2013/0077362 | A1 | 3/2013 | Kumar | |
| 2013/0163302 | A1 | 6/2013 | Li et al. | |
| 2013/0285627 | A1* | 10/2013 | Chae | G05F 1/46 323/271 |
| 2015/0077073 | A1* | 3/2015 | Yu | H02M 3/1584 323/271 |

FOREIGN PATENT DOCUMENTS

| | | |
|---|---|---|
| CN | 101867314 A | 10/2010 |
| CN | 104167918 A | 11/2014 |
| JP | 03169255 A2 | 7/1991 |
| JP | 2011010519 A2 | 1/2011 |
| KR | 1020090044137 A | 5/2009 |

OTHER PUBLICATIONS

Extended European Search Report for corresponding Application No. 15815772.7-1201/3163734 PCT/CN2015/078441; dated Jan. 30, 2018.
First Office Action for corresponding JP Application No. 2017-519762; dated Feb. 6, 2018.
Extended European Search Report for corresponding Application No. 15815772.7-1201/3163737 PCT/CN2015078441; dated Jan. 30, 2018.

* cited by examiner

DC-DC CONVERTER WITH HIGH TRANSFORMER RATIO

CROSS REFERENCE TO RELATED APPLICATIONS

The present disclosure is the national phase of International Application No. PCT/CN2015/078441, titled "DC-DC CONVERTER WITH HIGH TRANSFORMER RATIO", filed on May 7, 2015, which claims priority to Chinese Patent Application No. 201410310090.4, titled "DC-DC CONVERTER WITH HIGH TRANSFORMER RATIO", filed with the State Intellectual Property Office of People's Republic of China on Jun. 30, 2014, both of which are incorporated herein by reference in entirety.

FIELD

The present application relates to the field of power electronic technology, and in particular to a direct current to direct current converter with high transformer ratio.

BACKGROUND

In conventional technologies, an isolation solution is generally adopted to achieve a photovoltaic array output voltage in a wide range in a photovoltaic power generation system. That is, a boost ratio of a direct current to direct current converter in the system is improved by means of an isolation transformer.

However, leakage inductance energy in the isolation transformer may cause a series of issues, such as switch voltage overshoot and electromagnetic interference, thereby bringing a great security risk. In addition, the introduction of the isolation transformer brings additional energy loss, thereby reducing the energy conversion efficiency of the direct current to direct current converter.

Therefore, it is desired to be solved by those skilled in the art that, how to achieve a compromise between high boost ratio, high security-reliability and high energy conversion efficiency of the direct current to direct current converter.

SUMMARY

In view of the above, the present application provides a direct current to direct current converter with high transformer ratio, to ensure high security-reliability and high energy conversion efficiency of the direct current to direct current converter while improving a boost ratio of the direct current to direct current converter.

A direct current to direct current converter with high transformer ratio is provided, which includes two direct current to direct current converter bodies. Inputs of the two direct current to direct current converter bodies are connected in parallel and outputs of the two direct current to direct current converter bodies are connected in series.

In the direct current to direct current converter with high transformer ratio, each of the two direct current to direct current converter bodies may be a boost-buck direct current to direct current converter.

In the direct current to direct current converter with high transformer ratio, one of the boost-buck direct current to direct current converters may include a first inductor, a first power switch and a first series branch. The first inductor and the first power switch may be connected in series to a direct-current source. The first series branch may be connected in parallel to the first power switch. The first series branch may include a second power switch, a first capacitor and a second capacitor which are connected in series. The other one of the boost-buck direct current to direct current converters may include a second inductor, a third power switch and a second series branch. The second inductor and the third power switch may be connected in series to the direct-current source. The second series branch may be connected in parallel to the third power switch. The second series branch may include a fourth power switch, the second capacitor and a third capacitor which are connected in series.

In the direct current to direct current converter with high transformer ratio, each of the first power switch, the second power switch, the third power switch and the fourth power switch may be a MOS or may be an IGBT.

In the direct current to direct current converter with high transformer ratio, each of the two direct current to direct current converter bodies may be a boost direct current to direct current converter.

In the direct current to direct current converter with high transformer ratio, one of the boost direct current to direct current converters may include a first inductor, a first power switch and a first series branch. The first inductor and the first power switch may be connected in series to a direct-current source. The first series branch may be connected in parallel to the first power switch. The first series branch may include a first diode, a first capacitor and a second capacitor which are connected in series. The other one of the boost direct current to direct current converters may include a second inductor, a second power switch and a second series branch. The second inductor and the second power switch may be connected in series to the direct-current source. The second series branch may be connected in parallel to the second power switch. The second series branch may include a second diode, the second capacitor and a third capacitor which are connected in series.

In the direct current to direct current converter with high transformer ratio, each of the first power switch and the second power switch may be a MOS or may be an IGBT.

In the direct current to direct current converter with high transformer ratio, the two direct current to direct current converter bodies may include one boost-buck direct current to direct current converter and one boost direct current to direct current converter.

In the direct current to direct current converter with high transformer ratio, the boost-buck direct current to direct current converter may include a first inductor, a first power switch and a first series branch. The first inductor and the first power switch may be connected in series to a direct-current source. The first series branch may be connected in parallel to the first power switch. The first series branch may include a second power switch, a first capacitor and a second capacitor which are connected in series. The boost direct current to direct current converter may include a second inductor, a third power switch and a second series branch. The second inductor and the third power switch may be connected in series to the direct-current source. The second series branch may be connected in parallel to the second inductor. The second series branch may include a fourth power switch and a third capacitor which are connected in series. The first capacitor, the second capacitor and the third capacitor may be connected in series to achieve voltage dividing.

In the direct current to direct current converter with high transformer ratio, each of the first power switch, the second power switch, the third power switch and the fourth power switch are may be a MOS or may be an IGBT.

It can be seen from the above technical solutions that, in the present application, a direct current to direct current converter with high transformer ratio is obtained by connecting inputs of two direct current to direct current converter bodies to each other in parallel and connecting outputs of the two direct current to direct current converter bodies to each other in series. An input voltage of the direct current to direct current converter with high transformer ratio is equal to an input voltage of any one of the two direct current to direct current converter bodies, and an output voltage of the direct current to direct current converter with high transformer ratio is equal to a sum of output voltages of the two direct current to direct current converter bodies, thereby achieving a high transformer ratio of the direct current to direct current converter. In addition, the boost ratio is improved without an isolation transformer in the present application. Therefore, no additional energy loss is caused and no security risk due to leakage inductance energy exists.

BRIEF DESCRIPTION OF THE DRAWINGS

The drawings to be used in the description of the embodiments or the conventional technology will be described briefly as follows, so that the technical solutions according to the embodiments of the present application or according to the conventional technology will become clearer. It is apparent that the drawings in the following description only illustrate embodiments of the present application. For those skilled in the art, other drawings may be obtained according to these drawings without any creative work.

DETAILED DESCRIPTION OF EMBODIMENTS

For reference and clarity, technical nouns, shortenings or abbreviations to be used hereinafter are listed as follows.

MOS: Metal Oxide Semiconductor FET, Metal Oxide Semiconductor Field Effect Transistor; and IGBT: Insulated Gate Bipolar Transistor, Insulated Gate Bipolar Transistor.

The technical solution according to the embodiments of the present application will be described clearly and completely as follows in conjunction with the drawings. It is apparent that the described embodiments are only a few rather than all of the embodiments according to the present application. Any other embodiments obtained by those skilled in the art based on the embodiments in the present application without any creative work fall in the scope of the present disclosure.

An embodiment of the present application discloses a direct current to direct current converter with high transformer ratio, to ensure a high security-reliability and a high energy conversion efficiency of the direct current to direct current converter, while improving a boost ratio of the direct current to direct current converter. The direct current to direct current converter includes two direct current to direct current converter bodies. Inputs of the two direct current to direct current converter bodies are connected in parallel and outputs of the two direct current to direct current converter bodies are connected in series.

Since the two direct current to direct current converter bodies meet a circuit connection relationship of inputs being connected in parallel and outputs being connected in series, the obtained direct current to direct current converter with high transformer ratio has an input voltage equal to an input voltage of any one of the two direct current to direct current converter bodies and an output voltage equal to a sum of output voltages of the two direct current to direct current converter bodies, thereby having a high transformer ratio. In addition, a high boost ratio required by a system is achieved without an isolation transformer. In this case, no additional energy loss is caused and no security risk due to leakage inductance energy exists, thereby ensuring the high energy conversion efficiency and high security-reliability of the direct current to direct current converter.

The direct current to direct current converter with high transformer ratio according to the embodiment may be achieved with multiple circuit topologies. In the following, three of the circuit topologies are described in detail, for easy comprehension and application by those skilled in the art.

In a first solution, each of the two direct current to direct current converter bodies for forming the direct current to direct current converter with high transformer ratio is a boost-buck direct current to direct current converter.

Figure 1:
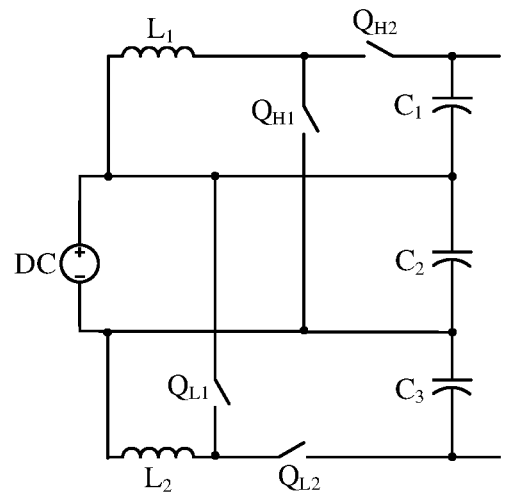
FIG. 1 is a circuit topology diagram of a direct current to direct current converter with high transformer ratio according to an embodiment of the present application.

Referring to FIG. 1, a first one of the boost-buck direct current to direct current converters includes a first inductor $L_1$, a first power switch $Q_{H1}$, and a first series branch. The first inductor $L_1$ and the first power switch $Q_{H1}$ are connected in series to a direct-current source DC. The first series branch is connected in parallel to the first power switch $Q_{H1}$. And the first series branch includes a second power switch $Q_{H2}$, a first capacitor $C_1$ and a second capacitor $C_2$ which are connected in series.

A second one of the boost-buck direct current to direct current converters includes a second inductor $L_2$, a third power switch $Q_{L1}$ and a second series branch. The second inductor $L_2$ and the third power switch $Q_{L1}$ are connected in series to the direct-current source DC. The second series branch is connected in parallel to the third power switch $Q_{L1}$. And the second series branch includes a fourth power switch $Q_{L2}$, the second capacitor $C_2$ and a third capacitor $C_3$ which are connected in series.

Each of the two boost-buck direct current to direct current converters is a bidirectional direct current to direct current converter which is capable of transferring energy bidirectionally (the bidirectional direct current to direct current converter serves as a boost direct current to direct current converter in its forward direction, and in this case, boost power switches corresponding to the boost direct current to direct current converter are respectively the first power switch $Q_{H1}$, and the third power switch $Q_{L1}$; and the bidirectional direct current to direct current converter serves as a buck direct current to direct current converter in its reverse direction, and in this case, buck power switches corresponding to the buck direct current to direct current converter are respectively the second power switch $Q_{H2}$ and the fourth power switch $Q_{L2}$). The two boost-buck direct current to direct current converters share the direct-current source DC and the second capacitor $C_2$ and meet the relationship of inputs being connected in parallel and outputs being connected in series. Accordingly, the formed direct current to direct current converter with high transformer ratio is also a bidirectional direct current to direct current converter with high boost-buck ratio.

In a case that the bidirectional direct current to direct current converter with high boost-buck ratio serves as a boost direct current to direct current converter in its forward direction, it has four working modes, i.e., mode 1 to mode 4.

Figure 2A:
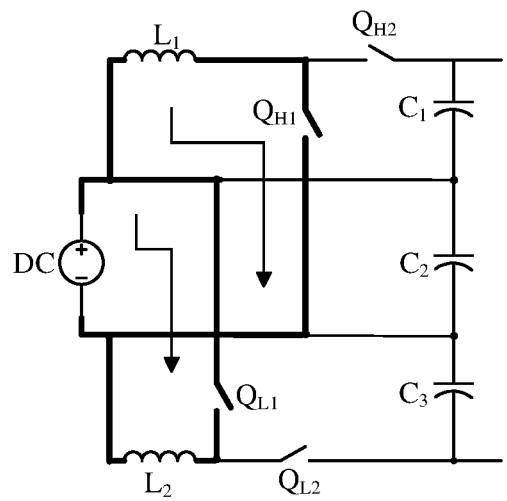
FIGS. 2A to 2D are respective schematic diagrams of current directions of a direct current to direct current converter with high transformer ratio in four working modes according to an embodiment of the present application in a case that the direct current to direct current converter with high transformer ratio boosts forwardly.

In mode 1, in a case that the first power switch $Q_{H1}$ and the third power switch $Q_{L1}$ both are switched on, the first inductor $L_1$ and the second inductor $L_2$ store energy. And corresponding current directions are as shown in FIG. 2A.

Figure 2B:
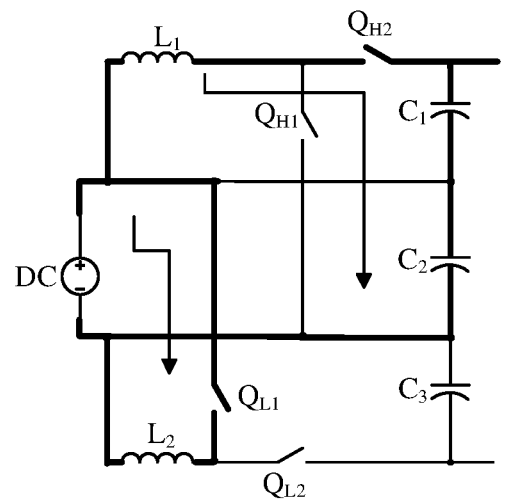

In mode 2, in a case that the first power switch $Q_{H1}$ is switched off and the third power switch $Q_{L1}$ is switched on, the first boost-buck direct current to direct current converter boosts forwardly and the second inductor $L_2$ stores energy. And corresponding current directions are as shown in FIG. 2B.

Figure 2C:
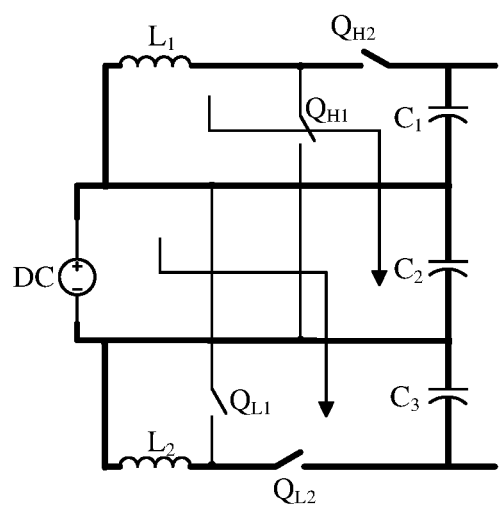

In mode 3, in a case that each of the first power switch $Q_{H1}$ and the third power switch $Q_{L1}$ is switched off, each of the two boost-buck direct current to direct current converters boosts forwardly. And corresponding current directions are as shown in FIG. 2C.

Figure 2D:
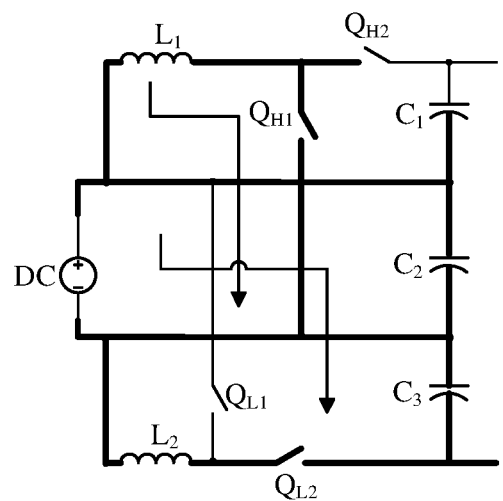

In mode 4, in a case that the first power switch $Q_{H1}$ is switched on and the third power switch $Q_{L1}$ is switched off, the first inductor $L_1$ stores energy and the second boost-buck direct current to direct current converter boosts forwardly. And corresponding current directions are as shown in FIG. 2D.

Based on the above four working modes, it can be recognized that, in the case that the bidirectional direct current to direct current converter with high boost-buck ratio boosts forwardly, its boost ratio is $V_{C_1}+V_{C_2}+V_{C_3}/V_{DC}$. The voltage $V_{DC}$ on a low-voltage side is a voltage across the direct-current source DC, and the voltage $V_{C_1}+V_{C_2}+V_{C_3}$ on a high-voltage side is a sum of voltages of three voltage-dividing capacitors, i.e., the first capacitor $C_1$, the second capacitor $C_2$ and the third capacitor $C_3$. Therefore, the boost ratio is higher than a boost ratio of the first boost-buck direct current to direct current converter, $(V_{C_1}+V_{C_2}/V_{DC})$, and a boost ratio of the second boost-buck direct current to direct current converter, $(V_{C_2}+V_{C_3}/V_{DC})$.

Similarly, the bidirectional direct current to direct current converter with high boost-buck ratio also has four working modes when serving as a buck direct current to direct current converter in a reverse direction. In this case, a buck ratio of the bidirectional direct current to direct current converter is $V_{C_1}+V_{C_2}+V_{C_3}/V_{DC}$. And the buck ratio is higher than a buck ratio of the first boost-buck direct current to direct current converter, $(V_{C_1}+V_{C_2}/V_{DC})$, and a buck ratio of the second boost-buck direct current to direct current converter, $(V_{C_2}+V_{C_3}/V_{DC})$.

As can be seen, the first solution improves the boost-buck ratio of an existing bidirectional direct current to direct current converter, and addresses the issue in the conventional technologies. It should be noted that, in the first solution, each of the first power switch $Q_{H1}$, the third power switch $Q_{L1}$, the second power switch $Q_{H2}$ and the fourth power switch $Q_{L2}$ may be a MOS or may be an IGBT, which is not intended to limiting.

Figure 3:
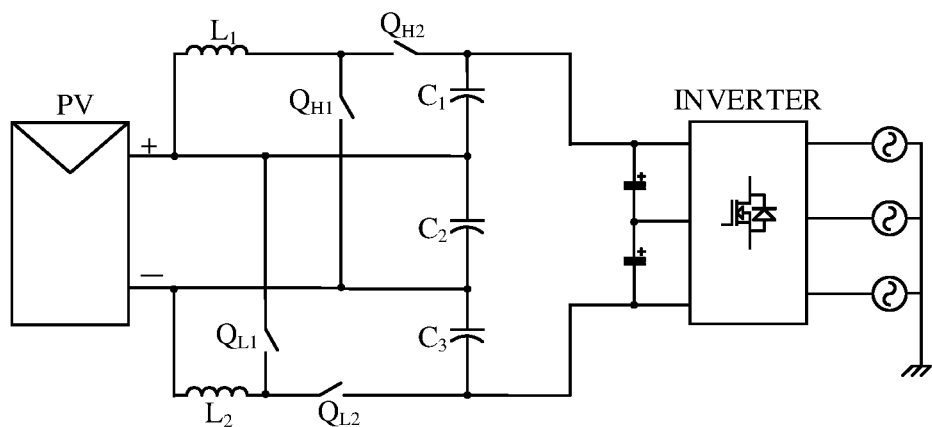
FIG. 3 is a schematic structural diagram of a photovoltaic power generation system including a direct current to direct current converter with high transformer ratio according to an embodiment of the present application.

In addition, in the first solution, the direct-current source DC may be a storage battery. Since energy can flow bidirectionally in the bidirectional direct current to direct current converter with high boost-buck ratio, the battery can be charged and discharged if the direct-current source DC is the storage battery. Or, the direct-current source DC may be a photovoltaic cell PV (as shown in FIG. 3), and in this case, the photovoltaic cell can only be discharged. If the first solution is applied in a photovoltaic power generation system, a photovoltaic array output voltage in a wide range in the photovoltaic power generation system can be achieved by connecting a photovoltaic inverter INVERTER to an output side of the bidirectional direct current to direct current converter with high boost-buck ratio.

In a second solution, each of the two direct current to direct current converter bodies for forming the direct current to direct current converter with high transformer ratio is a boost direct current to direct current converter.

Figure 4:
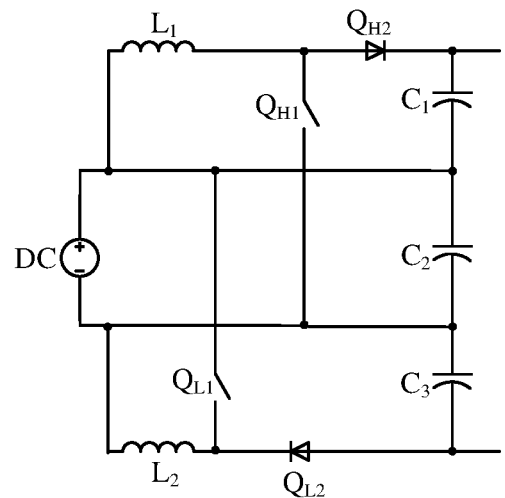
FIG. 4 is a circuit topology diagram of a direct current to direct current converter with high transformer ratio according to an embodiment of the present application.

Referring to FIG. 4, a first one of the boost direct current to direct current converters includes a first inductor $L_1$, a first power switch $Q_{H1}$ and a first series branch. The first inductor $L_1$ and the first power switch $Q_{H1}$ are connected in series to a direct-current source DC. The first series branch is connected in parallel to the first power switch $Q_{H1}$. And the first series branch includes a first diode $Q_{H2}$, a first capacitor $C_1$ and a second capacitor $C_2$ which are connected in series.

A second one of the boost direct current to direct current converters includes a second inductor $L_2$, a second power switch $Q_{L1}$ and a second series branch. The second inductor $L_2$ and the second power switch $Q_L$ are connected in series to the direct-current source DC. The second series branch is connected in parallel to the second power switch $Q_{L1}$. And the second series branch includes a second diode $Q_{L2}$, the second capacitor $C_2$ and a third capacitor $C_3$ which are connected in series.

Each of the two boost direct current to direct current converters is a direct current to direct current converter which is only capable of achieving a forward flowing of energy (boost power switches corresponding to the two direct current to direct current converters are respectively the first power switch $Q_{H1}$ and the second power switch $Q_{L1}$). The two boost direct current to direct current converters share the direct-current source DC and the second capacitor $C_2$, and meet a relationship of inputs being connected in parallel and outputs being connected in series. Accordingly, the formed direct current to direct current converter with high transformer ratio is also a unidirectional direct current to direct current converter with high boost ratio, with the boost ratio being $V_{C_1}+V_{C_2}+V_{C_3}/V_{DC}$. The voltage $V_{DC}$ on a low-voltage side is a voltage across the direct-current source DC, and the voltage $V_{C_1}+V_{C_2}+V_{C_3}$ on high-voltage side is a sum of voltages of three voltage-dividing capacitors, i.e., the first capacitor $C_1$, the second capacitor $C_2$ and the third capacitor $C_3$.

Since $V_{C_1}+V_{C_2}+V_{C_3}/V_{DC}$ is higher than a boost ratio of the first boost direct current to direct current converter, $(V_{C_1}+V_{C_2}/V_{DC})$, and a boost ratio of the second boost direct current to direct current converter, $(V_{C_2}+V_{C_3}/V_{DC})$, the second solution significantly improves the boost ratio of an existing unidirectional direct current to direct current converter, and addresses the issue in the conventional technologies. It should be noted that, the work principle of the unidirectional direct current to direct current converter with high boost ratio is the same as that of the bidirectional direct current to direct current converter with high boost-buck ratio disclosed in the first solution when the bidirectional direct current to direct current converter boosts forwardly, and thus is not described hereinafter. In addition, similarly, in the second solution, each of the first power switch $Q_{H1}$ and the second power switch $Q_{L1}$ may be implemented as a MOS or an IGBT.

In a third solution, the two direct current to direct current converter bodies for forming the direct current to direct current converter with high transformer ratio include one boost-buck direct current to direct current converter and one boost direct current to direct current converter.

Figure 5A:
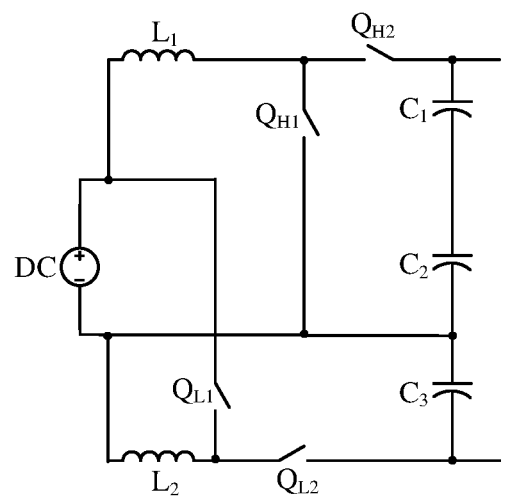
FIG. 5A is a circuit topology diagram of a direct current to direct current converter with high transformer ratio according to an embodiment of the present application.

Referring to FIG. 5A, the boost-buck direct current to direct current converter includes a first inductor $L_1$, a first power switch $Q_{H1}$ and a first series branch. The first inductor $L_1$ and the first power switch $Q_{H1}$ are connected in series to a direct-current source DC. The first series branch is connected in parallel to the first power switch $Q_{H1}$. And the first series branch includes a second power switch $Q_{H2}$, a first capacitor $C_1$ and a second capacitor $C_2$ which are connected in series.

The boost direct current to direct current converter includes a second inductor $L_2$, a third power switch $Q_{L1}$ and a second series branch. The second inductor $L_2$ and the third power switch $Q_{L1}$ are connected in series to the direct-current source DC. The second series branch is connected in parallel to the second inductor $L_2$. And the second series branch includes a fourth power switch $Q_{L2}$ and a third capacitor $C_3$ which are connected in series.

The first capacitor $C_1$, the second capacitor $C_2$ and the third capacitor $C_3$ are connected in series to achieve voltage dividing.

The boost-buck direct current to direct current converter is a bidirectional direct current to direct current converter, and may serve as a boost direct current to direct current converter (a boost power switch corresponding to the boost direct current to direct current converter is the first power switch $Q_{H1}$) in its forward direction. The above two direct current to direct current converters share the direct-current source DC, and the first capacitor $C_1$, the second capacitor $C_2$ and the third capacitor $C_3$ are connected in series, so that a relationship of inputs being connected in parallel and outputs being connected in series is met. Accordingly, the formed direct current to direct current converter with high transformer ratio may serve as a boost direct current to direct current converter directly, with a boost ratio being $V_{C_1}+V_{C_2}+V_{C_3}/V_{DC}$. The voltage $V_{DC}$ on a low-voltage side is a voltage across the direct-current source DC, and the voltage $V_{C_1}+V_{C_2}+V_{C_3}$ on a high-voltage side is a sum of voltages of three output voltage-dividing capacitors, i.e., the first capacitor $C_1$, the second capacitor $C_2$ and the third capacitor $C_3$.

Since $V_{C_1}+V_{C_2}+V_{C_3}/V_{DC}$ is higher than a boost ratio of the boost-buck direct current to direct current converter, $(V_{C_1}+V_{C_2}/V_{DC})$, and a boost ratio of the boost direct current to direct current converter, $(V_{C_3}/V_{DC})$, the third solution significantly improves the boost ratio of an existing unidirectional direct current to direct current converter, and addresses the issue in the conventional technologies. In addition, in the third solution, each of the first power switch $Q_{H1}$, the third power switch $Q_{L1}$, the second power switch $Q_{H2}$ and the fourth power switch $Q_{L2}$ may be implemented with a MOS or an IGBT, which is not intended to limiting.

Figure 5B:
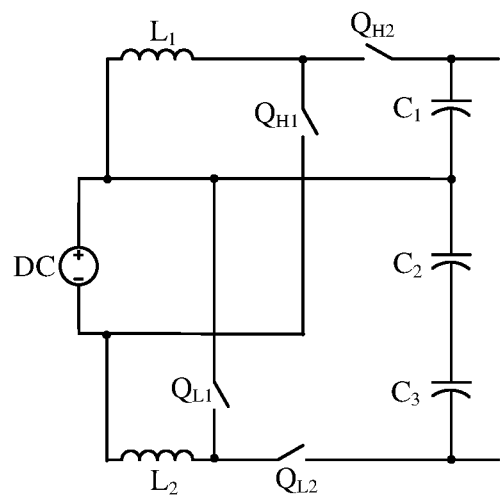
FIG. 5B is a circuit topology diagram of a direct current to direct current converter with high transformer ratio according to an embodiment of the present application.

Further, the third solution may be implemented with a circuit topology shown in FIG. 5B. In the circuit shown in FIG. 5B, an upper portion is the boost direct current to direct current converter, and a lower portion is the boost-buck direct current to direct current converter. And in the circuit shown in FIG. 5A, an upper portion is the boost-buck direct current to direct current converter, and a lower portion is the boost direct current to direct current converter. And the two circuits have a same working principle.

In summary, in the present application, a direct current to direct current converter with high transformer ratio is obtained by connecting inputs of two direct current to direct current converter bodies to each other in parallel and connecting outputs of the two direct current to direct current converter bodies to each other in series. An input voltage of the direct current to direct current converter with high transformer ratio is equal to an input voltage of any one of the direct current to direct current converter bodies, and an output voltage of the direct current to direct current converter with high transformer ratio is equal to a sum of output voltages of the two direct current to direct current converter bodies, thereby achieving the high transformer ratio of the direct current to direct current converter. Furthermore, a wide boost ratio is achieved without an isolation transformer, thus no additional energy loss is caused and no security risk due to leakage inductance energy exists.

The above illustration of the disclosed embodiments enables those skilled in the art to implement or practice the present application. Many changes to these embodiments are apparent for those skilled in the art, and general principles defined herein can be implemented in other embodiments without departing the spirit or scope of the present disclosure. Hence, the embodiments of the present application are not limited to the embodiments disclosed herein, but are to conform to the widest scope consistent with principles and novel features disclosed herein.

The invention claimed is:

1. A direct current to direct current converter with high transformer ratio, comprising two direct current to direct current converter bodies,
    wherein inputs of the two direct current to direct current converter bodies are connected in parallel and outputs of the two direct current to direct current converter bodies are connected in series, and the inputs of the two direct current to direct current converter bodies are connected to a positive electrode and a negative electrode of a direct current source respectively;
    wherein each of the two direct current to direct current converter bodies is a boost-buck direct current to direct current converter;
    wherein one of the boost-buck direct current to direct current converters comprises a first inductor, a first power switch and a first series branch, the first inductor and the first power switch are connected in series to a direct-current source, the first series branch is connected in parallel to the first power switch, and the first series branch comprises a second power switch, a first capacitor and a second capacitor which are connected in series; and
    the other one of the boost-buck direct current to direct current converters comprises a second inductor, a third power switch and a second series branch, the second inductor and the third power switch are connected in series to the direct-current source, the second series branch is connected in parallel to the third power switch, and the second series branch comprises a fourth power switch, the second capacitor and a third capacitor which are connected in series.

2. The direct current to direct current converter with high transformer ratio according to claim 1, wherein each of the first power switch, the second power switch, the third power switch and the fourth power switch is a MOS or an IGBT.

3. A direct current to direct current converter with high transformer ratio, comprising two direct current to direct current converter bodies,
  wherein inputs of the two direct current to direct current converter bodies are connected in parallel and outputs of the two direct current to direct current converter bodies are connected in series, and the inputs of the two direct current to direct current converter bodies are connected to a positive electrode and a negative electrode of a direct current source respectively
  wherein each of the two direct current to direct current converter bodies is a boost direct current to direct current converter;
  wherein one of the boost direct current to direct current converters comprises a first inductor, a first power switch and a first series branch, the first inductor and the first power switch are connected in series to a direct-current source, the first series branch is connected in parallel to the first power switch, and the first series branch comprises a first diode, a first capacitor and a second capacitor which are connected in series; and
  the other one of the boost direct current to direct current converters comprises a second inductor, a second power switch and a second series branch, the second inductor and the second power switch are connected in series to the direct-current source, the second series branch is connected in parallel to the second power switch, and the second series branch comprises a second diode, the second capacitor and a third capacitor which are connected in series.

4. The direct current to direct current converter with high transformer ratio according to claim 3, wherein each of the first power switch and the second power switch is a MOS or an IGBT.

5. A direct current to direct current converter with high transformer ratio, comprising two direct current to direct current converter bodies,
  wherein inputs of the two direct current to direct current converter bodies are connected in parallel and outputs of the two direct current to direct current converter bodies are connected in series, and the inputs of the two direct current to direct current converter bodies are connected to a positive electrode and a negative electrode of a direct current source respectively;
  wherein the two direct current to direct current converter bodies comprises one boost-buck direct current to direct current converter and one boost direct current to direct current converter;
  wherein the boost-buck direct current to direct current converter comprises a first inductor, a first power switch and a first series branch, the first inductor and the first power switch are connected in series to a direct-current source, the first series branch is connected in parallel to the first power switch, and the first series branch comprises a second power switch, a first capacitor and a second capacitor which are connected in series; and
  the boost direct current to direct current converter comprises a second inductor, a third power switch and a second series branch, the second inductor and the third power switch are connected in series to the direct-current source, the second series branch is connected in parallel to the second inductor, and the second series branch comprises a fourth power switch and a third capacitor which are connected in series,
  wherein the first capacitor, the second capacitor and the third capacitor are connected in series to achieve voltage dividing.

6. The direct current to direct current converter with high transformer ratio according to claim 5, wherein each the first power switch, the second power switch, the third power switch and the fourth power switch is a MOS or an IGBT.

* * * * *